Aug. 21, 1956  J. L. PETTIT  2,759,588
CONVEYOR MECHANISM
Filed May 20, 1955  4 Sheets-Sheet 1

INVENTOR.
JACK L. PETTIT
BY Moses, Nolte, Crews & Berry
ATTORNEYS

Aug. 21, 1956   J. L. PETTIT   2,759,588
CONVEYOR MECHANISM
Filed May 20, 1955   4 Sheets-Sheet 3

INVENTOR.
JACK L. PETTIT
BY
Moses, Nolte, Crews & Berry
ATTORNEYS

INVENTOR.
JACK L. PETTIT

United States Patent Office 2,759,588
Patented Aug. 21, 1956

2,759,588
CONVEYOR MECHANISM

Jack L. Pettit, Florham Park, N. J., assignor to Metalwash Machinery Company, Elizabeth, N. J., a copartnership Application May 20, 1955, Serial No. 509,783

1 Claim. (Cl. 198—31)

The present invention relates to conveying mechanisms and systems. More particularly, this invention concerns a conveyor arrangement for conveying unassambled metal drums and the drum covers through a processing system.

A customary means for transporting many materials to local consumers is by large cylindrical sheet metal drums. These drums consist of a cylindrical portion open at both ends and a pair of flanged covers. However, before assembling these parts together, it is necessary that the drums and covers be thoroughly cleaned and processed so as to remove dirt, filings, and all surface particles which would otherwise contaminate the future contents of the drums. Furthermore, before a drum can be reused, it must again be thoroughly washed and processed. The aforementioned processing consists of various stages and operations where the drum is subjected to an alkali wash, rinsing, phosphating and further rinsing. Extensive systems have been provided for such processing, but heretofore, the need has existed for a conveyor to transport the unassembled drums and their removed covers through the processing system. It is this problem that led to the development of the present invention.

A primary object of this invention is to provide a conveyor for conveying unassembled cylindrical drums and the covers therefor.

A further object of this invention is to provide an improved type drum conveyor.

Another object of this invention is to provide a conveyor mechanism especially adapted for conveying unassembled drums and drum covers through a washing and processing system.

Other objects of the invention are to provide a conveying mechanism for unassembled drums bearing the above objects in mind which is of simple construction, inexpensive to manufacture, has a minimum number of parts, is efficient and effective in use.

For other objects and a better understanding of the invention, reference may be had to the following detailed description, taken in connection with the accompanying drawing in which:

Figure 6 is a detail of the right end of the system of Fig. 1 showing the drums at the end of their upper run and being conveyed to the lower run; and Figure 7 is a fragmentary perspective view showing the conveyor mechanism with a drum and two covers thereon.

Since the conveyor has special utility in a washing and processing system, it will be herein described with reference to such a system. However, since the processing system forms no part of the present invention only so much of the system will be described as will give a proper understanding of the special utility of the conveyor. It is, of course, understood that the conveyor mechanism has utility in other than the processing system herein described and therefore is not to be considered as limited in any way by the washing and processing system herein disclosed and described.

In order to effectively wash drums for reuse, it is necessary to remove the covers from each end so that the drum is passed through the washer as an open ended hollow cylindrical shell. In this way, the bath solutions to which the drum is subjected may readily enter either end of the drum and then pass out without collecting in the bottom thereof. The drums for which this invention is especially adapted have removable flanged covers at each end which are removed from the drums before the washing and processing operation. The covers must, of course, be processed similarly to the body of the drum. For efficiency of operation, it is necessary that two covers pass through the processing system for each drum that passes therethrough. In accordance with this requirement, the conveyor mechanism is designed to provide conveying pockets each of which will handle one drum and two covers. As will be described in detail, a series of tracks and rails are located with respect to the moving conveyor pockets to support the drum at a small angle with the horizontal and support the two covers in a vertical position. The purpose of supporting the drum at an angle is to permit the bath solutions to flow out as the drum is conveyed from one bath to another.

Figure 1:
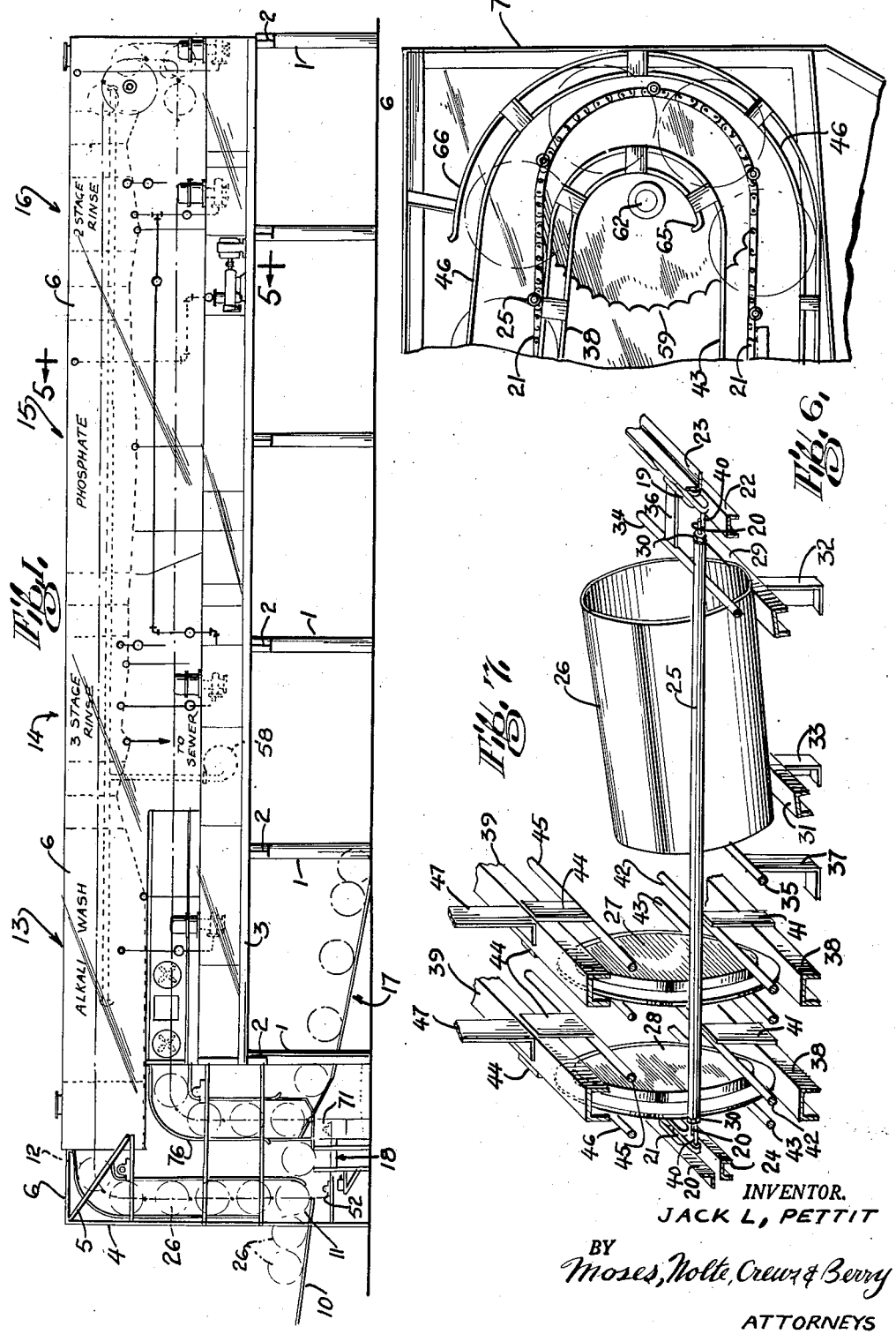
Figure 1 is a side elevation of a processing system employing the conveyor of the present invention.
Figures 3, 4:
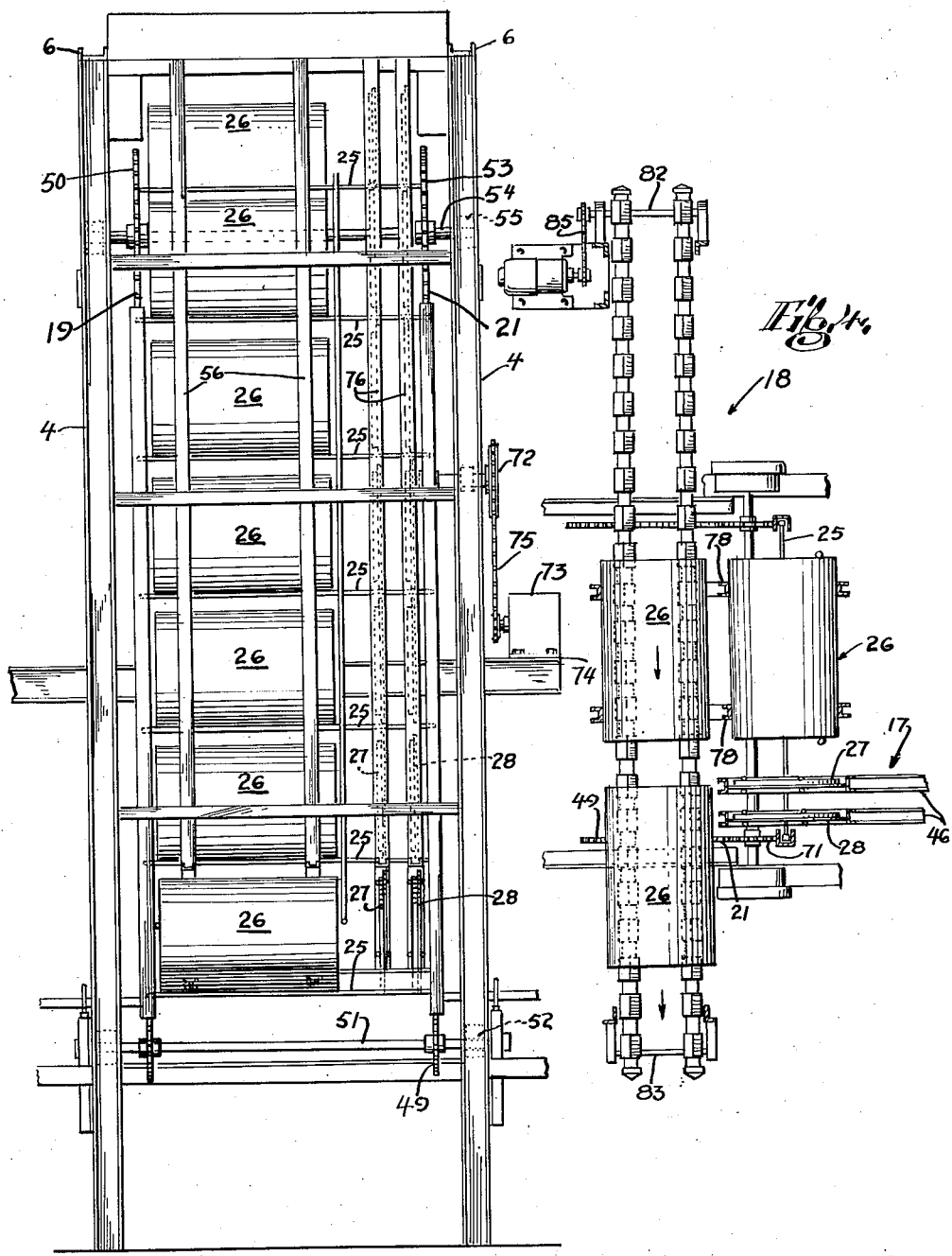
Figure 3 is a front elevation of Figure 2.
Figure 4 is a sectional view taken on the line 4—4 of Figure 2.

Referring now to Fig. 1, there is shown a processing system employing the present invention. The processing system is mounted on a framework supported on legs 1 which may be made of I-beams to provide a solid base for the system. Transverse beams 2 are suitably bolted to opposite pairs of legs 1 to support longitudinal beams 3 as seen in Figs. 1 and 3. The front end of the system is enclosed in a housing 4 held in place by supports 5 secured to the framework. An additional housing 6 extends the length of the system covering the top and sides thereof and an end plate (Fig. 6) encloses the end of the system. The drums are loaded on an inclined chute 10 which feeds them to a point where they are automatically picked up in order by the conveyor mechanism. Drum 11 is located at the pick up point in the position where it is first received by the conveyor. The drums and lids are elevated vertically to the position occupied by drum 12 where the direction of the conveyor changes to move the drums horizontally through the various stages of the system. Briefly, these stages include an alkali wash 13, three stage rinse 14, phosphating 15 and two stage rinse 16, and if desired, a chronic acid rinse thereafter. At the end of this upper rim, the conveyor directs the drums down to a lower run where they are passed through a drying stage. At the end of the lower run, the drums and covers are lowered by the conveyor. The lids or covers are discharged down a chute 17 and the drums pass to another conveyor 18.

The conveyor mechanism is shown in detail in Fig. 7 which will now be referred to. The moving part of the conveyor comprises two link chains 19 and 21 to which continuous movement is imparted by a suitable motor and gearing arrangement. A track is provided for each of the link chains to lend support thereto and direct them along proper paths. Chain 19 is supported on an inverted horizontal channel 22 and along the outer side of horizontal angle 23. Similarly the track for link chain 21 comprises channel 24 and angle 20. Cross bars 25 are secured to the link chains 19 and 21 at proper intervals along the length of the chains. Cross bar 25 may comprise a hollow pipe of suitable length with a rod 20 passing through the center thereof. The rod 20 is threaded at each end and extends beyond the ends of the cross bar 25 as seen in Fig. 7. A nut 30 is received by each of the threaded ends of rod 20 to form a rigid unit whereby each rod is held in the proper position within its respective cross bar. The extended ends of the rod are then secured in any suitable manner as by welding to pins 40 which are received by the link chains 19 and 21. The spacing between the cross bars will depend upon the diameter of the drums being conveyed. It is seen, therefore, that an area is defined by two successive cross bars 25 and the two chains. For convenience of description, this area will be herein referred to as a conveying pocket. The number of such conveying pockets will depend on the length of the chains and the distance between the cross bars. A drum 26 and two lids 27 and 28 are received within each of the conveying pockets. A pair of tracks 29 and 31 support the drums as they are moved along by the conveyor. These tracks may be made of inverted channels or pipes bolted or otherwise secured to brackets 32 and 33 respectively which are in turn fastened to the framework of the mechanism. It should be especially noted that track 29 is disposed at a higher elevation than track 31. Thus, the drum is supported at an angle to allow for proper draining thereof. The tracks 29 and 31 are themselves angularly disposed in a lateral direction so that each presents a flat surface to the drum. The drum is prevented from lateral displacement by two guide rails 34 and 35 secured in place by brackets 36 and 37 respectively, although the rails may be laterally adjustable to accommodate different sizes of drums, which are of varying lengths. A pair of tracks and four guide rails are provided for each of the lids or covers 27 and 28. Since the arrangement for each is the same, it will be sufficient here to describe the arrangement for the cover 27, it being understood that the tracks and guide rails for cover 28 are similar. A pair of U-beams 38 and 39 are positioned with the open side down so that the flange on cover 28 rides on the outer surface of the base portion of beam 38 and is guided between the sides of beam 39, as shown in Fig. 7. A series of brackets 41 are secured to the outer sides of track 38 to support two parallel guide rails 42 and 43. Similarly, brackets 44 are secured to the outer faces of track 39 to support guide rails 45 and 46. The tracks 38 and 39 are secured in any suitable manner to the framework of the conveyor mechanism as by bracket 47. It is seen from the above description that the tracks and guide rails which are all parallel with each other provide three parallel paths for the drum and two lids. The link chains with the cross bars move the drums and lids along the paths thus defined.

Figure 2:
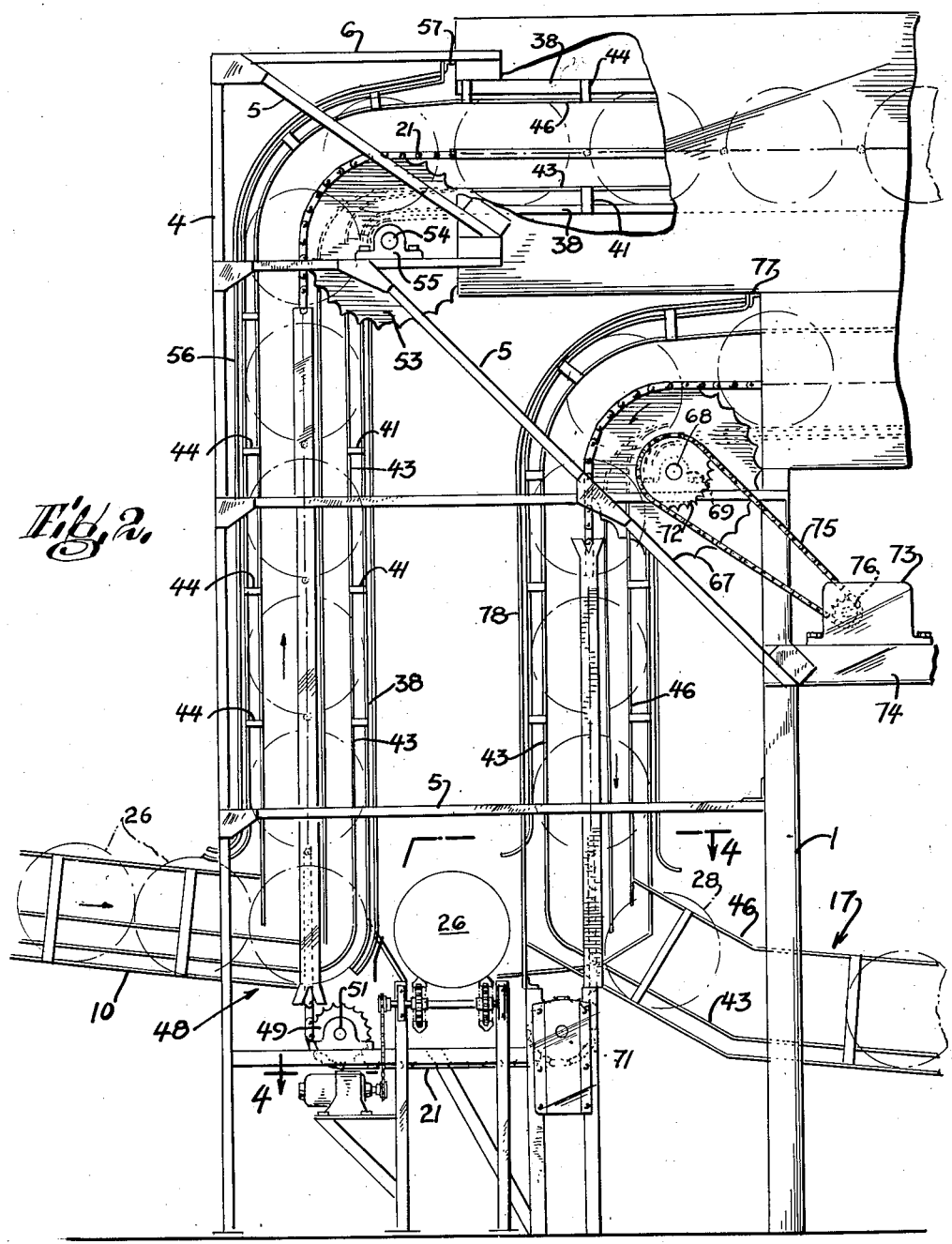
Figure 2 is a side elevation showing the entrance and exit points of the system of Figure 1.

Considering now the conveyor as employed with the washing system hereinabove described, reference will be had to Fig. 2. The drums 26 are fed down a chute 10 and the lids 28 are loaded manually at the point indicated by arrow 48. It is seen that at this point the above described tracks 38 and 39 are curved at their ends to receive the lids. The link chain 21 passes around a sprocket 49 secured to a shaft 51 journalled in a bearing 52. As the chains 19 and 21 move upward, a cross bar 25 will engage a drum and two lids which are thereby lifted. The next succeeding drum then rolls into the pick up position and two lids are manually loaded onto their respective track to be engaged in turn by the next cross bar 25. The tracks and guide rails prevent any lateral displacement of the conveyed elements.

The chain 21 then passes around a gear 53 secured to a shaft 54 journalled in a bearing 55. The chain 19 (Fig. 3) passes around a gear 50 similar to gear 53 which is also secured to rotatable shaft 54. It should be noted that an additional guide rail 56 is provided along this initial vertical run to prevent outward displacement of the drums. This short guide rail 56 terminates at bracket 57 secured to the framework.

The upper horizontal run of the conveyor carries the drums and lids through the alkali wash 13 which is the first step of the washing process. From the alkali wash the drums and lids are conveyed to the three stage rinse 14 where a pump 48 causes a thorough washing and rinsing. Following the rinse 14, the drums and lids are subjected to a phosphate treatment and further rinse.

As the conveyor reaches the end of the upper run, it is directed down to the lower run by an arrangement more clearly seen in Figs. 3 and 6. A pair of gears 59 and 61 are secured to shaft 62 which in turn is journalled in bearings 63 and 64. The link chains 19 and 21 pass around these gears to start the lower run. Similarly, the drum and lid tracks and guide rails above described are curved to parallel the path of the chains. In turning down to the lower run, the conveyor system is in effect inverted. Hence, the lower tracks of the upper run are terminated at point 65 (Fig. 6) and a new set of lower tracks start at point 66. During the turn from the upper to lower run, both sets of tracks overlap to effectively guide the drums and lids around the turn. The guide rails continue from the upper run to the lower run. However, the upper guide rails on the upper run become the lower rails after the turn. Similarly, the lower rails of the first run are in the position of upper rails on the second. This interchange of the guide members is readily seen in Fig. 6.

Figure 5:
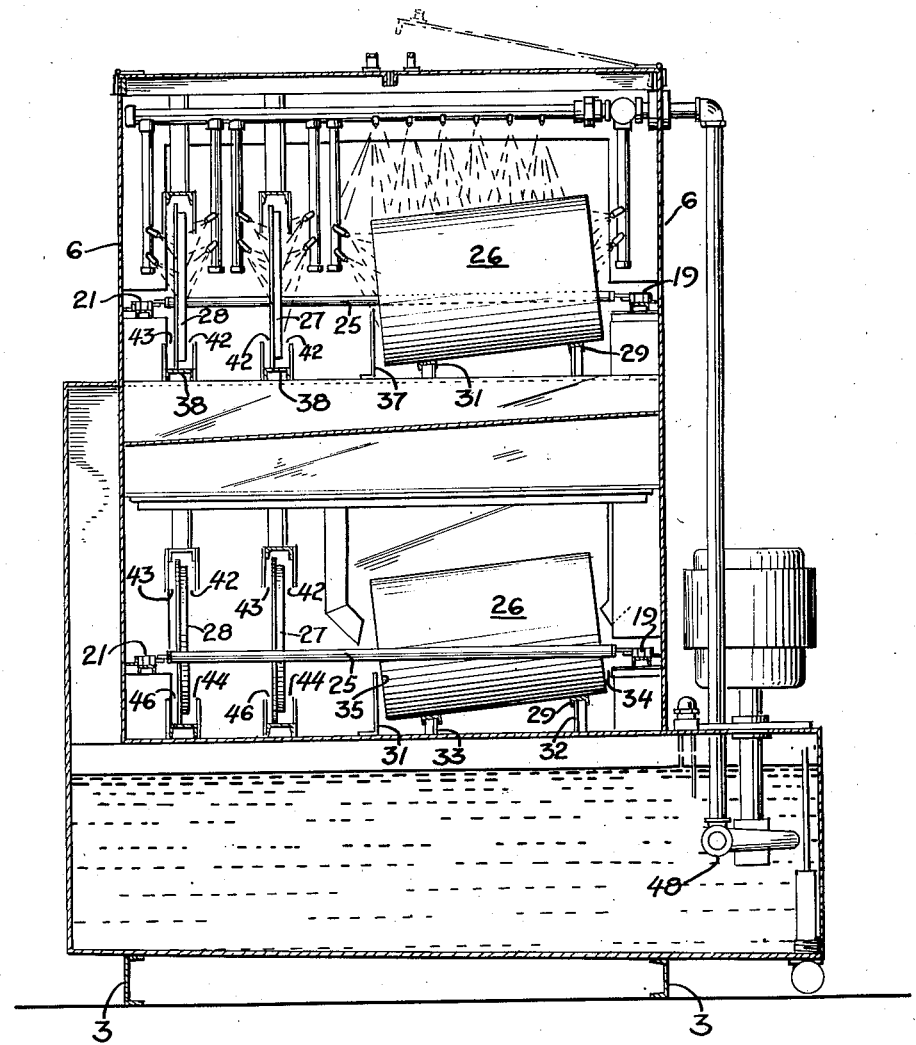
Figure 5 is a sectional view taken on the line 5—5 of Figure 1.

As the drums and lids are conveyed along the bottom or second run of the conveyor, they are subjected to a drying operation. Reference is made to Fig. 5 which shows a drum and two lids receiving a phosphate treatment and a second drum and lids being conveyed through the drying stage along the bottom run of the conveyor.

At the end of the lower run, the link chain 21 passes around a gear 67 (Fig. 2) secured to a shaft 68 journalled in bearing 69. It will be understood that chain 19 passes around a similar gear also secured to shaft 68. The conveyor then follows a vertical path and chain 21 passes around a gear 71. The drum and lid tracks and guide rails are similarly curved to parallel the path of the moving conveyor. A gear 72 is secured to shaft 68 as seen in Fig. 2. An electric motor 73 is bolted to a bracket 74 which is fastened to the framework. A link chain 75 passes around gear 72, and a pinion 76 on the motor shaft to provide power for the conveyor. An additional guide rail 78 is provided for the length of this vertical run of the conveyor to maintain the drums in their proper position. Guide 78 starts at bracket 77 and terminates in a curved end 78. At the termination of guide 76, the drums are permitted to roll onto a conveyor generally indicated by numeral 18. The lids 28 are guided by the lid tracks and guide rails down a chute 17 to a suitable receptacle. Conveyor 18 comprises two continuous belts of any convenient construction to hold the drums 26. These belts pass around sprockets secured to shafts 82 and 83 as seen in Fig. 4. Power for this conveyor 18 is derived from a motor 84 which drives shaft 82 through a belt and pulley arrangement 85.

I have described what I believe to be the best embodiments of my invention. I do not wish, however, to be confined to the embodiments shown, but what I desire to cover by Letters Patent is set forth in the appended claim.

I claim:

A conveyor mechanism for hollow cylindrical drums and the ends therefor, comprising a pair of parallel link chains, means for driving said chains, a plurality of cross bars secured to opposite points of said chains, at substantially equally spaced intervals therealong, conveying pockets formed by said chains and said cross bars, each of said conveying pockets adapted to receive a drum and a pair of drum lids located laterally of said drum, a first pair of tracks to guide and support said conveying chains, a first guide means extending parallel with said conveying chains, said first guide means comprising a second pair of parallel tracks, one of which is disposed slightly higher than the other, whereby drums are supported thereon at an angle with respect to the horizontal, second guide means extending parallel with said conveying chains located to prevent lateral displacement of said drums, said second guide means comprising a first pair of parallel guide rails capable of lateral adjustment to accommodate varying length drums, third guide means to support a line of drum lids in a vertical position in said conveying pockets, said third guide means comprising a third pair of parallel tracks disposed one above the other in vertical alignment, the upper one of said tracks being inverted channel-shaped, a second pair of parallel guide rails located above said lower track and a third pair of guide rails located below said upper track, said second and third pair of parallel guide rails being aligned with the outer side of said third pair of parallel tracks, whereby a path is defined for said drum lid, a fourth guide means located adjacent said third guide means defining a path for a second line of drum lids, said fourth guide means comprising a fourth pair of parallel tracks disposed one above the other and guide rail means whereby said second line of drum lids are maintained in a vertical position in said conveying pockets, means to feed said drum and drum lids to said conveying mechanism, means to move said conveying pockets in a vertical direction to an upper run position, means whereby said drums and lids are moved horizontally through a series of process stages in said upper run, means to move said conveying pockets to a lower run, said lower run being directly under and parallel to but separated from said upper run, means whereby said drums and lids are moved horizontally through a series of drying stations in said lower run, means to discharge said drums in one direction from said conveying means and means to discharge said lids in other directions from said conveying means.

References Cited in the file of this patent
UNITED STATES PATENTS

| | | |
|---|---|---|
| 1,062,379 | Anderson et al. | May 20, 1913 |
| 1,250,764 | Baker | Dec. 18, 1917 |
| 1,389,853 | Blakeslee | Sept. 6, 1921 |
| 1,736,778 | De Back | Nov. 26, 1929 |
| 1,770,931 | Lathrop | July 22, 1930 |
| 2,085,936 | Wolf | July 6, 1937 |